United States Patent [19]

Thatte et al.

[11] Patent Number: 4,757,438
[45] Date of Patent: Jul. 12, 1988

[54] COMPUTER SYSTEM ENABLING AUTOMATIC MEMORY MANAGEMENT OPERATIONS

[75] Inventors: Satish Thatte, Richardson; Donald W. Oxley, Carrollton, both of Tex.

[73] Assignee: Texas Instruments Incorporated, Dallas, Tex.

[21] Appl. No.: 630,478

[22] Filed: Jul. 12, 1984

[51] Int. Cl.⁴ ............................................. G06F 12/08
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,825,904 | 7/1974 | Burk et al. | 364/200 |
| 3,938,096 | 2/1976 | Brown et al. | 364/200 |
| 4,047,243 | 9/1977 | Dijkstra | 364/200 |
| 4,057,848 | 11/1977 | Hayashi | 364/200 |
| 4,253,145 | 2/1981 | Goldberg | 364/200 |
| 4,388,685 | 6/1983 | Kotok et al. | 364/200 |
| 4,410,941 | 10/1983 | Barrow et al. | 364/200 |
| 4,459,661 | 7/1984 | Kaneda et al. | 364/200 |

Primary Examiner—Gareth D. Shaw
Assistant Examiner—Kevin A. Kriess
Attorney, Agent, or Firm—Kenneth C. Hill; Thomas W. DeMond; Melvin Sharp

[57] ABSTRACT

A computer system is provided which enables automatic memory operations independently of a CPU. The computer system includes a virtual machine and a logical memory system which is accessed by the virtual machine through a binding register unit, enabling the virtual machine to allocate blocks and specify the length of the blocks. Data within the blocks can also be specified by the user by relative indexing with respect to a block specifier in the binding register unit. The logical memory system is controlled by a separate memory management unit which manages the physical memory of the system and which manages the memory to have the logical memory system appearance to the virtual machine.

5 Claims, 4 Drawing Sheets

COMPUTER SYSTEM ENABLING AUTOMATIC MEMORY MANAGEMENT OPERATIONS

BACKGROUND OF THE INVENTION

1. Field of the Invention

This invention relates to improvements in computer systems, and more particularly to improvements in a computer system of the type in which memory management operations are enabled to be performed independently of and in parallel with an associated central processing unit (hereinafter referred to as the CPU).

2. Background Information

The development of storage management systems has a long history with many related branches of research. Over the years, a great deal of attention has been given to the allocation and deal location of memory structures. Many memory structures, for example, are shown by Deitel, H. M., *An Introduction to Operating Systems,* Addison-Wesley, Mass., Chapter 7, 1982. Other major issues are discussed by Knuth, D., *The Art of Computer Programming, Vol. 1: Fundamental Algorithms,* Addison-Wesley, Reading, Mass., 1968. The invention herein described is concerned with computer systems having heap managed memories which are automatically managed. The functions which are automatically managed can include, for instance, memory allocation, deallocation, compaction, garbage collection, and so forth, as will become apparent. Heap managed means that the memory is allocated and freed (either explicitly or implicitly) without regard to the temporal order or the size of the memory unit under consideration. An automatically managed memory refers to a memory which is selfreclaiming garbage collected. A garbage collected memory is one in which usable memory is automatically reclaimed, and the memory may be reorganized from time to time to efficiently utilize the space of the memory, as needed. A survey of garbage collection techniques and related background materials is presented by Cohen, J. "Garbage Collecton of Linked Data Structures", *Computing Surveys,* Vol. 13, No. 3, September, 1981, pp. 341-367. P. Bishop discusses garbage collection in very large address spaces in "Garbage Collection in a Very Large Address Space", Massachusetts Institute of Technology, Working Paper 111, September, 1975.

Presently, implementations of computer languages, such as Lisp, and to a lesser extent, Pascal and Ada, support such heap allocated memories (Lisp implementations supporting garbage collected memory, as well). In traditional compiler architectures where the memory allocation, de-allocation, garbage collection and compaction are provided, normally the language runtime support and the complier used have the responsibility for the garbage collection and compaction. However, occasionally, and unfortunately, the application programmers end up with the responsibility of storage management. If a virtual memory system is provided, it is normally the responsibility of the hardware and operating system to manage the virtual memory system. Typically, for example, the operating system will use some type of demand paged, least recently used (LRU) scheme for determining when and how to move pages between main memory and the backing store, and the garbage collector specifies which pages will be needed or which will no longer be needed. This leads to, at best, a suboptimal use of machine resources and poor performance.

"Knowledge bases" are becoming of interest with the rapid development of artificial intelligence (AI) technology. Knowledge bases are large data bases for use, for instance, in containing large and complex information structures requiring dynamic organization. See, for example, Suwa, M., et al, "Knowledge Base Mechanisms", *Preliminary Report on Fifth Generation Computer Systems,* ICOT, 1980. Examples of some large data bases under consideration or implemented include, for instance, data bases which contain legal information, verbatim case reports, medical information for use in diagnosing possible diseases which present particular symptoms, certain patent information including abstracts, claims, and assignment information, and many engineering data bases, including CAD/CAM data bases and the like. In such data bases, it is often desirable to search through sometimes millions of words and characters to find the few, if any, occurrences of a particular set of words and characters, then identify a particular record (case, patent, diagnosis, etc.) related to the words and characters. The management or manipulation of such large data bases is usually the responsibility of presently available specialized machine software. Such software is usually referred to as the "data base manager".

Thus, in systems available today, storage is usually managed in hardware, operating system, language implementations, data bases, and even application programs. The heap management and garbage collection is managed by the run-time support and compiler, the virtual memory by the operating system, and the knowledge base and data base by the data base manager. There are a large number of techniques in use, which, at best, result in local optimizations, but more often, do not work together symbiotically. These techniques are often difficult for the individual programmer to understand or manage.

The speed of memory allocation presents a difficult problem if memory blocks are not of constant size or are not managed in the last-in first-out (LIFO) discipline. Also, the time delay between a block of memory becoming inaccessible (that is, unreachable by any program) and the time that its space is available for reuse is a frequently encountered problem. Additionally, the overall size of a virtual memory space is often of concern, since garbage collection costs increase with the size of the space being collected not with the amount of garbage being reclaimed. Finally, security or integrity is a significant problem, because programs can either intentionally or through inadvertence overwrite or destroy data or structure (i.e., pointers).

SUMMARY OF THE INVENTION

In light of the above, it is therefore, an object of the invention to provide a computer system which enables automatic memory management.

It is another object of the invention to provide a computer system of the type described in which the responsibilities of a virtual machine (defined in detail below) and a memory management unit (MMU) are essentially separate, with the virtual machine having no memory management responsibility; the MMU having the ability to freely move data within the memory; both the virtual machine and MMU being capable of operating separately, independently, and concurrently; and the virtual machine being prevented from accidentally or intentionally destroying the structural information necessary to maintain the organizational integrity of the memory.

It is another object of the invention to provide a computer system of the type described which presents a logical address space to the virtual machine which enables the virtual machine to view the memory as being block oriented.

It is another object of the invention to provide a memory management system of the type described which is free from implementation of the virtual machine.

It is another object of the invention to provide a computer system of the type described having a memory which is allocatable in blocks accessible by the virtual machine only through an appropriately configured interface.

These and other objects, features, and advantages will become apparent to those skilled in the art from the following detailed description when read in conjunction with the accompanying drawings and appended claims.

The computer system, in accordance with a broad aspect of the invention, includes a virtual machine which is characterized in that it can execute Read, Write, Copy, and EQ instructions with regard to allocated memory blocks. The computer system operation is based upon the use of an interface including binding registers, which interfaces the virtual machine to the memory, and which enables the memory to be seen by the virtual machine as a block oriented memory, and which permits a memory management unit to control memory overhead functions independently and practically invisibly from the virtual machine.

BRIEF DESCRIPTION OF THE DRAWING

The invention is illustrated in the accompanying drawings in which.

In the various figures of the drawing, like reference numerals are used to denote like or similar parts.

DETAILED DESCRIPTION OF THE PREFERRED EMBODIMENTS

Figure 1:
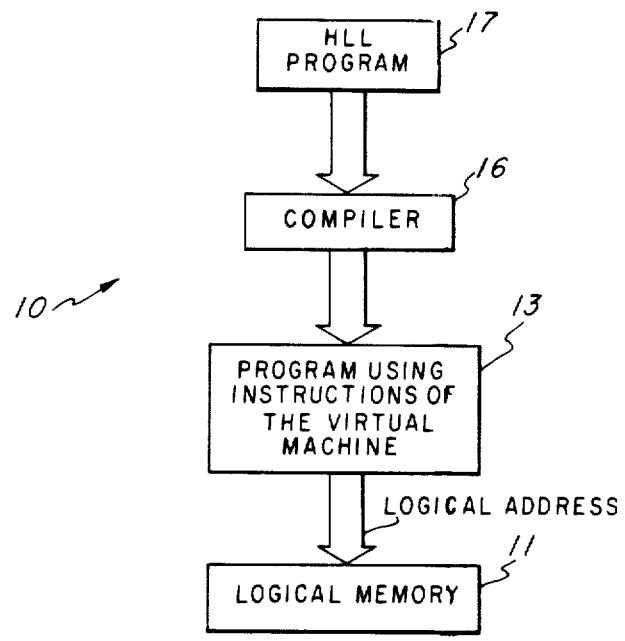
FIG. 1 is a block diagram of the interrelationship of the virtual machine and the logical memory, in accordance with the invention.
Figure 3:
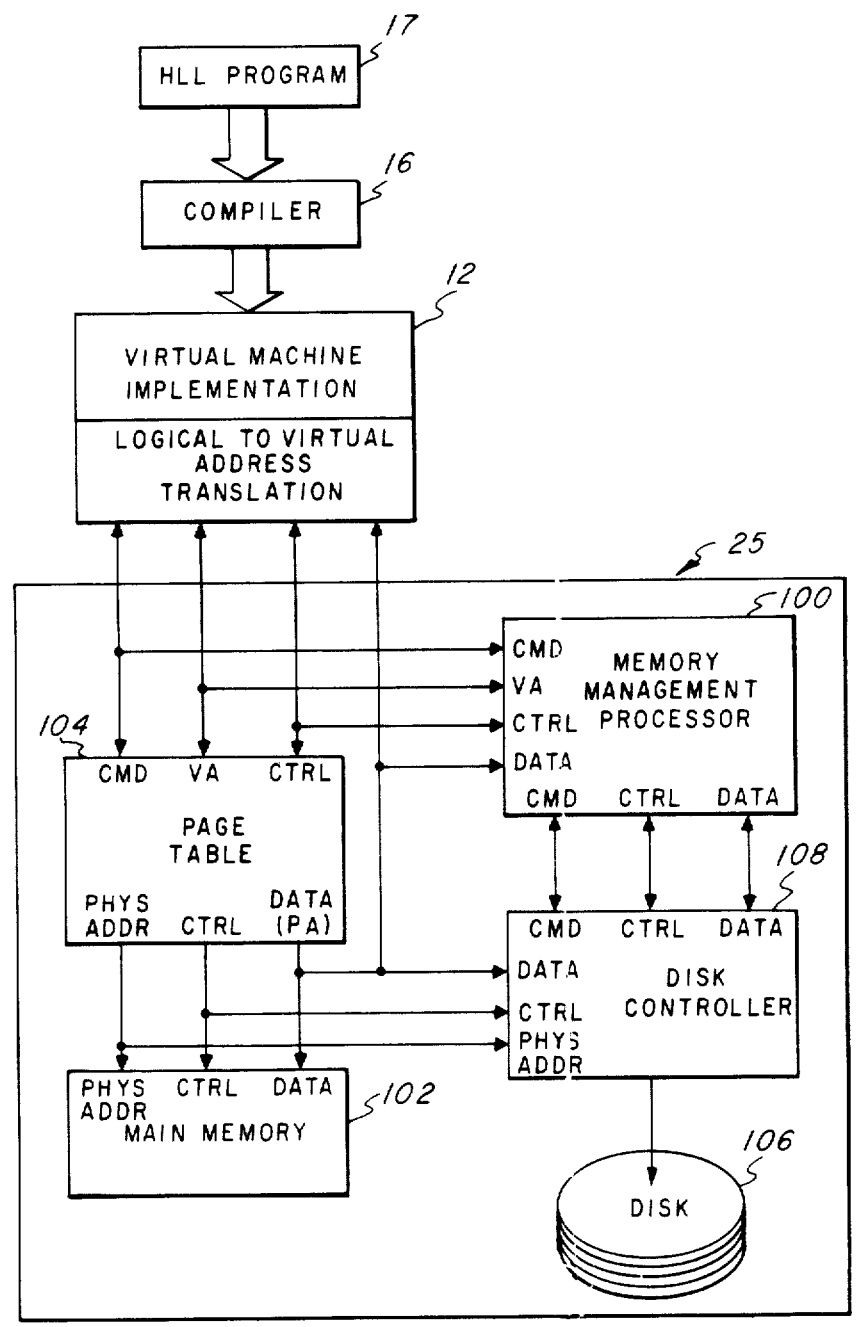
FIG. 3 is a block diagram of a binding register configuration for use in interfacing the virtual machine and the virtual address space in accomplishing a preferred embodiment of the computer system of the invention.

FIG. 1 is a block diagram illustrating the architecture of the computer system 10 in accordance with the invention. The computer system includes a logical memory 11, and which is addressed by a virtual machine 12 (see FIG. 3). (The term "virtual machine" as used herein is not to be confused with the terms "virtual memory" or "virtual address space", all of these terms being defined below.)

In the embodiment illustrated, the virtual machine 12 includes a CPU 21 (FIG. 4), a set of binding registers 22, and program instructions 13 (FIG. 1) for controlling the operation of the CPU 21. The CPU 21 serves to provide two primary functions: (1) to implement the virtual machine, i.e. providing the facility to interpret the instruction set determining the virtual machine and (2) to manage the binding registers 22 and to translate logical addresses applied to its input to virtual addresses at its output.

The logical addresses are generated within a logical address space by a compiler 16, which compiles a high level language program, box 17, to a program comprising instructions defining the virtual machine. The high level language can be, for example, LISP, PASCAL, etc.

The "logical address space" is an abstraction of memory comprising memory blocks interconnected by pointers. The memory space is addressed by a pair consisting of a register designator and an index, (sometimes referred to as an "r-index"). The designated register can contain a pointer to the beginning of a block within the logical address space. The r-index is the relative displacement of a particular memory cell from the beginning or header address of the block.

The logical address space abstraction is implemented on top of the virtual address space, which is, itself, an abstraction of memory. The virtual address space is a large linear array of memory cells, each addressable by a unique virtual address. The virtual address space is too large to be implemented all in one semiconductor memory; hence, it is usually implemented by a memory hierarchy comprising a semiconductor memory backed by a disk store.

The instruction set defining the virtual machine contains the instructions necessary to address the memory system of the invention in terms the logical addresses of the logical memory 11. As used herein, in general, a "virtual machine" is a model or abstraction of a machine which has certain predefined characteristic attributes, which exhibits certain behavior, and which can be implemented in any one of a number of various ways. In particular, the virtual machine described herein is defined by an instruction set, which is the target of the compilation process. A subset of these instructions interfaces with the logical memory. The subset minimally comprises: (1) Allocate logical address, block size; (2) Write data into a logical address; (3) Read a logical address; (4) EQ logical address #1 with logical address #2; and (5) Copy contents of logical address #1 to logical address #2. Thus, the set of commands to the memory system comprises (1) an Allocate command to allocate blocks of specified size at a logical address and bind the allocateed block to the logical address, (2) a Write a command to write data into the allocated logical address space (3) a Read command to read data from the allocated logical address space, (4) an "EQ test" for determining if two pointers within the logical address space refer to the same block of allocated logical address space, and (5) a Copy command to copy pointers within the allocated logical address space.

Even so, and as will become apparent, the virtual machine is not permitted to write pointers into the logical address space. Although other commands can be equally advantageously employed, as will be apparent to those skilled in the art, the above enumerated commands are presently considered to be minimally required of the memory system of the invention; that is, it is considered that the five commands enable the operation of the memory system, and distinguish it from computer and memory systems of the prior art. It will also be apparent to those skilled in the art that other, additional commands can easily be implemented within the memory system thus described, many of which can be accomplished through various combinations of the specified above commands. The commands are described in further detail below.

As will become apparent, unlike existing computers and their memory systems, the responsibilities of the virtual machine 12 and the (MMU) advanced herein are essentially separate. That is, the virtual machine 12 has no memory management responsibilities, and the MMU can freely move data within the memory. The virtual machine 12 is not concerned about the location of memory blocks pointed at by pointers, nor is it concerned about the implementation of the pointers. Moreover, the virtual machine 12 can not accidentally or intentionally destroy or change the structural information (i.e., the pointers interconnecting memory blocks) of the memory which is necessary to maintain the organizational integrity of the memory.

Figure 2:
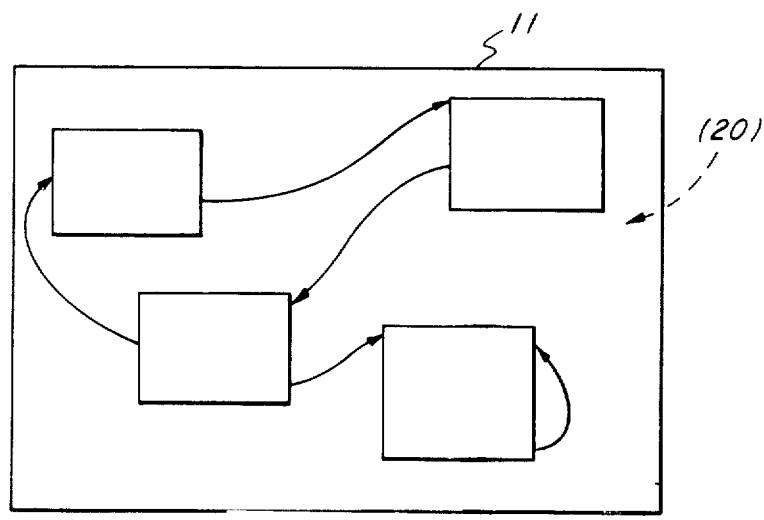
FIG. 2 is a diagram of the computer system in accordance with the invention illustrating the appearance of the memory as a logical address space to the associated virtual machine.

The logical memory 11 has the appearance to the virtual machine 12 of being block oriented. With reference now to FIG. 2, despite the actual implementation of the memory system, it has an apparent logical memory organization as seen by the virtual machine 12, as indicated by the reference numeral (20) and its associated dotted arrow. The apparent organization is that of an arbitrary number of blocks of arbitrary length interconnected by an arbitrary pointer structure, as shown.

The hardware for realizing the memory management unit 25 in conjunction with the physical memory to form the computer system 10 of the invention can be quite general. As shown, command (CMD), virtual address (VA), control (CTRL) and data lines are provided to the memory 25 from the logical to virtual address translation mechanism of the virtual machine 12. The operation of the memory system 25 is controlled by a memory management processor 100, to which command, virtual address, control and data lines are provided from the virtual machine. Depending upon the particular type of physical memory in conjunction with which the memory system of the invention is to be operated, various memory interfacing apparatuses can be provided for control by the processor 100. Thus, as shown, a main memory 102 is provided which may include, for instance, a physical memory, for example, semiconductor memory. The main memory 102 is connected to the virtual machine 12 by a page table unit 104. The address flow between the virtual machine 12 and physical memory 102 is controlled through the page table unit 104. The page table unit 104 is under the control of the processor 100, having command, virtual address, control and data lines connected between the virtual machine 12 and page table unit 104. In addition, a disk unit 106 may be provided as a form of memory with which the memory management unit 25 in accordance with the invention may be used. The disk unit 106 can be of any magnetic disk, optical, or other well known disk memory, as known in the art. The disk unit 106 is controlled by a disk controller 108, again controlled by the processor 100 by control, data, and command lines, and with respect to the virtual machine 12 and page table unit 104 by data, control and physical address lines, as shown.

It should be noted that although a physical main memory 102 and disk unit 106 are shown. It is not intended that the invention be limited in any way to such memory types, as it will be apparent to those skilled in the art that other memory types and configurations can be equally advantageously employed in practicing the invention.

The MMU 25 is interfaced to the CPU 21 by a set of binding registers 22, described below in detail with reference to FIGS. 4 and 5, which serve as a window or portal into and out of the logical memory system (20) as which the MMU 25 appears. As will be apparent, the circuitry for the binding registers 22 can be fabricated in standard TTL or MSI circuitry or on a custom LSI or VLSI chip using well known techniques.

The CPU 21 has microcode which serves two functions, (1) to interpret instructions of the virtual machine, and (2) to manage binding registers and translate logical addresses to virtual addresses. The design of the microcode, as will be apparent to those skilled in the art, depends upon such factors as the type of CPU employed, the type of hardware for construction of the memory system, and so on. It will be understood that various other forms of implementation of the memory system can be equally advantageously employed.

The philosophy of binding registers 22 is based upon the notion that at any instant, the virtual machine 12 can directly address only a limited number of memory blocks; more specifically, the virtual machine can directly address those blocks whose pointers are contained in binding registers.

The virtual machine 12 typically uses binding registers 22 in two modes of operation. A binding register may be loaded with a memory block pointer in order to establish the addressability of the block. This is referred to as a "binding" operation of a memory block to the specific binding register, the term "binding" being used to emphasize the association of the binding register with the block. As will become apparent, there are certain constraints upon the source of block pointers which can be contained in a binding register: the only source of block pointers is from a previously bound block or another binding register.

The other primary mode of operation of the binding register is as a base for referencing a value within the block bound to it. For example, in response to a virtual machine request for data in a specified relative block location, the CPU microcode managing the binding registers, in the manner below described, develops a virtual address for the particular cell contained within the block by adding an index to the pointer to the block contained in the binding register. It will be appreciated that it is necessary to verify that the index is a valid one for the particular block, for example, that the index does not specify the fourth word of a two word block. The binding registers support this type of addressing as a relative index to a register name which is currently bound to a block. The microcode managing the binding register therefore provides complete checking to see that the index is valid before sending the virtual address to the MMU.

Figure 4:
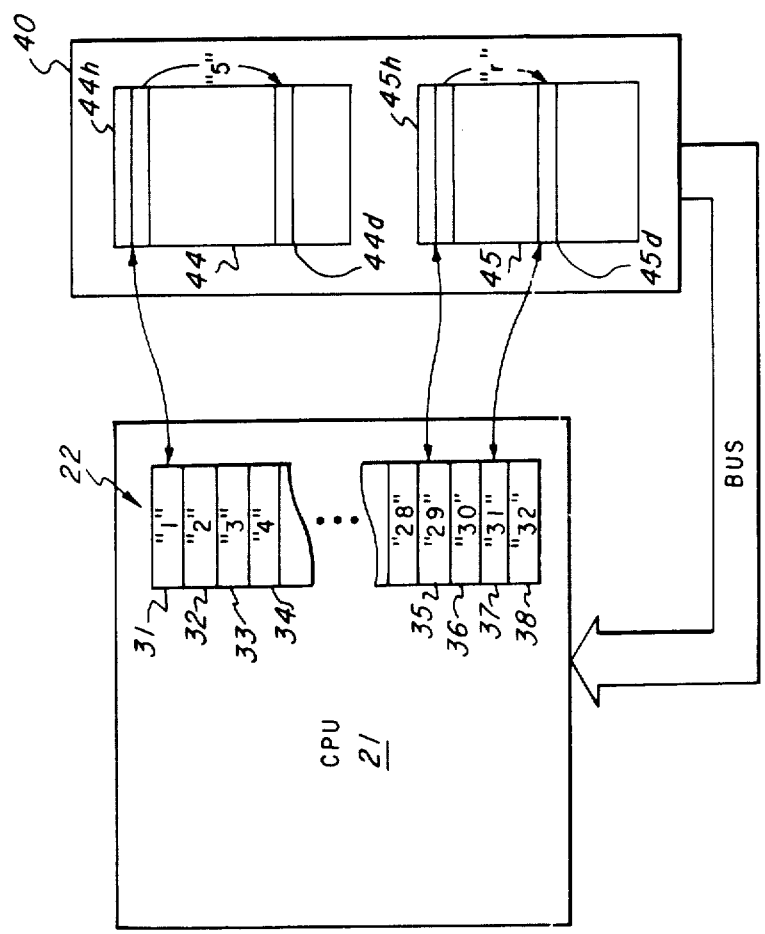
FIG. 4 is a block diagram showing the relationship of a CPU and associated binding registers with a logical memory in accomplishing the computer system, in accordance with the invention.

More specifically, with reference now to FIG. 4, the set of binding registers 22 includes a number of individual binding registers "1" through "32", each of which is addressable and manipulatable by the virtual machine 12. The manner by which the virtual machine addresses the binding registers is by specifying a particular binding register, such as "register 1", "register 5", and so on. It should be noted that although thirty-two binding registers are shown for ease of description, the set of binding registers may have as many binding registers as needed for the particular application.

Within the memory system of the invention is a large virtual memory 40 (below described in detail) from which memory blocks can be allocated. For example, in the diagram of FIG. 4, two memory blocks 44 and 45 have been established by appropriate commands (below described) by the virtual machine 12. Each of the bound blocks includes a header portion 44h and 45h, a portion of which is reproduced into the corresponding ones of binding registers "1"-"32" of the set of binding registers 22. The header of each respective block may contain, among other things, block-level tags, block length data, flags, and the like.

Additionally contained in each blocks 44 and 45 are data words 44d and 45d, respectively. The data words 44d and 45d are displaced from the respective headers of the blocks 44 and 45 by a number of address locations. The number of address locations depends on many factors, including the specification of a particular address displacement by the virtual machine 12. More particularly, the virtual machine 12 can write data into the block 44 at location 44d by specifying a displacement from the header, contained, for instance, in register "1" of the set of binding registers 22. The manner by which the virtual machine specifies the desired block location is by specifying the particular binding register to which the block is bound (for instance, "register 1") and the displacement within the bound block (for instance, "5"). The specified value can then be read and returned directly to the virtual machine as data.

Thus, by way of example, and as will become even more apparent, in the process of binding a block, say block 44, of some specified length, to a binding register, say register "1", the virtual machine 12 may issue an "Allocate" command to the logical memory system (20). In implementing the "Allocate" instruction of the virtual machine 12, the CPU 21 sends an "Allocate" command to the MMU. After allocating the block, the MMU returns the pointer (which is the virtual address of the block 44. This pointer is then be placed in the target binding register, such as register "1", as indicated in the "Allocate" instruction of the virtual machine. Thereafter, the virtual machine might issue a command to write data into the block 44 by specifying a displacement "5" from the address of the header pointed to by the pointer in binding register "1". It should be emphasized that the virtual machine 12 specifies only the particular binding register ("1") containing the pointer and the displacement "5", not the address of the block 44, or of the cell into which the data is to be written.

Figure 5:
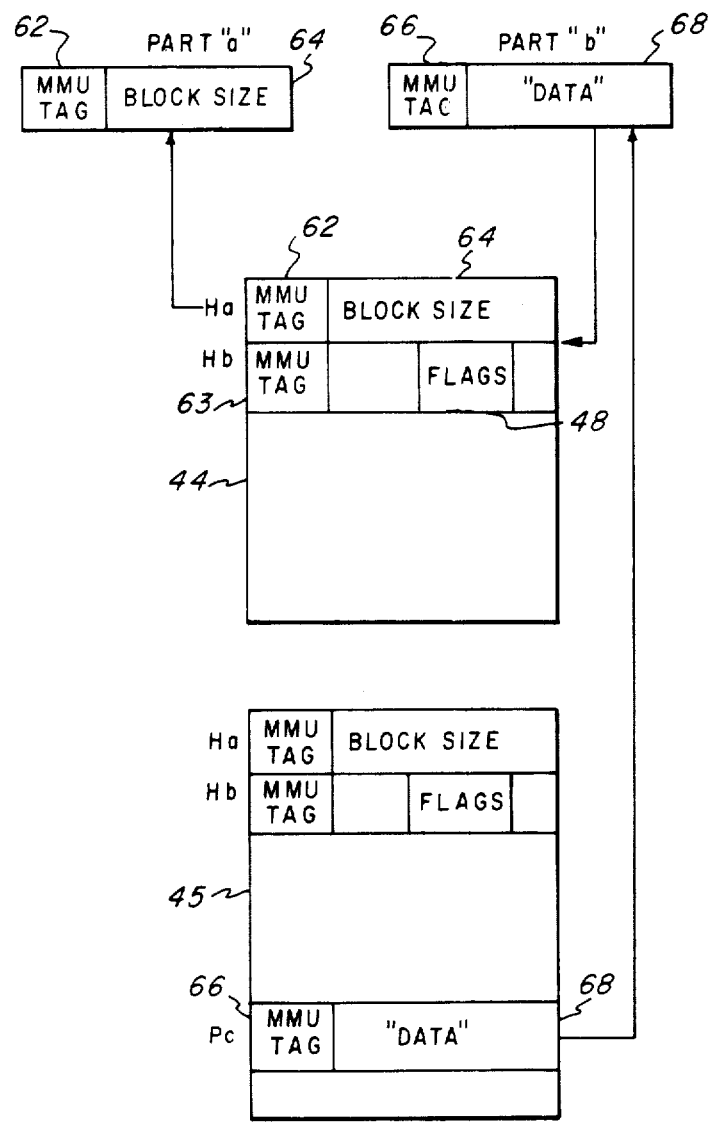
FIG. 5 is a block diagram of a generalized hardware implementation of the memory of the computer system, in accordance with the invention.

A portion of the binding register and the process of binding a block are described in greater detail in FIG. 5, to which reference is now made. Each binding register has two parts, denoted "Part a" and "Part b". Each of the parts a-b contains certain block identifying information, as below described in detail. For reference, blocks 44 and 45 are shown, to which block 44 is to be bound to the binding register "1" including Parts a-b. It can be seen that the header information in the block 44 is contained at the beginning of the block 44, with the first cell containing information which corresponds to the information in part "a" of the binding register. (Additional information not of interest to the binding process herein is also contained in the header portion 40h.)

With reference once again to Part "a" of the binding register, two pieces of information are given, namely an MMU tag 62 and a block size 64.

Thus, in the binding process of a block to a binding register, a particular block location or address is referenced by the virtual machine by a relative index. As shown in FIG. 5, the particular location referenced is denoted by Pc in a referencing block 45. The CPU 21 reads the virtual address of cell Pc and puts it in the Part "b" of binding register "1". Part "b" has two segments, the first segment 66 is for a memory management unit tag and the second segment 68 is for either data or for a pointer to the header of a particular block. It is this "data" word which contains the pointer reference to the block 44 to be bound to the binding register unit. The MMU tag 66 indicates whether or not the "data" is in fact a pointer, and if the "data" is a valid pointer, that pointer will reference the header information 44h of the block 44 to be bound. The information in the first cell of the header 44h is then moved to register Part "a" in the manner described above, thereby completing the binding process.

In the operation of the computer system of the invention, one or more flags can be provided in the block header, for example, in cells 48 of a second header portion. At least one of the flags serves as a lock so that, when set, no changes can be made by the virtual machine 12 to the block 44. This is useful, for example, when the block is being copied, moved, rearranged, and the like, for instance during garbage collection or other action being performed by the memory management unit.

In addition, the block size indication in register portion 64 of Part "a" of the binding register is necessary to determine whether an index exceeds the valid length of the block.

The MMU tags in segments 62 and 63 are associated with both the header and the data portions of the block. The tags required by the memory management unit are enforced in a manner so that the virtual machine is prevented from writing a "pointer" and also to verify that a cell actually contains a pointer before attempting to bind a particular block. It should be noted that in a tagged memory of the type described herein, the tags cannot be arbitrarily set by the virtual machine. Thus, since each pointer carries an MMU tag indicating that the data represents a pointer, the pointers within the blocks may not be modified by the virtual machine. The virtual machine can, however, over-write the pointer with data, which would result in the destruction of the pointer, but is prohibited from direct alteration or modification of the pointer.

With the computer system 10 thus constructed, its operation, in general, will be described as follows. The virtual machine 12 first issues a block allocate command to the memory system. As a part of the block allocate command, the virtual machine specifies the size of the block desired and a binding register to which the block to be allocated or created is bound. The memory system then creates the requested block. The virtual machine 12 may then issue a write command directed to the specified memory block, and stating a relative block location at which the virtual machine desires that data be written. Thereafter, if it is desired to read the data previously written, the virtual machine 12 issues a read command to the memory system specifying the offset at which the data was previously written. The memory management system then delivers to the virtual machine the previously written data.

One aspect of the operation of the memory system includes the formulation and operation of the pointers within the allocated blocks. Thus, if, for instance, it is desired to reference one block from another, a pointer may be established in the referencing block to the referenced block at a relative address. The pointer would be established by the MMU, not by the virtual machine, and would be located at an indexed relative location in the referencing block. If desired, the virtual machine can issue an EQ test command to the MMU to determine whether two relative locations in a particular block or in two blocks contain pointers to the same block. The EQ test can also be used to determine whether two particular relative locations of the same or different block contain the same data.

Finally, if the virtual machine no longer needs a particular block, it may issue a deallocate command to the memory management unit, requesting that the block be destroyed. With the memory management unit thus configured, it will be appreciated that many operations which heretofore were necessarily conducted by the virtual machine, the compiler, assembler, or such, can now be automatically performed or implemented by the MMU. Notably, garbage collection can be implemented automatically, without a requirement that the ongoing processing steps of the virtual machine be halted during the garbage collection process. The garbage collection techniques can be generally any techniques which have been heretofore used, examples of which are shown in an article by G. Baker, Jr., "List Processing in Real Time on a Serial Computer", *Communications of the ACM*, Vol. 21, No. 4. April, 1978. Inasmuch as the garbage collection within the memory unit is invisible to the virtual machine, and independent of it, the garbage collection techniques used can, in fact, efficiently be compacting garbage collection techniques, enabling even more efficient use of the physical memory of the memory management unit.

Additionally, since the length of each block which is allocated is known and cannot be exceeded in use, the memory is protected from accidental or intentional destruction by the user, for instance, by an attempt to write data into a block at an index beyond the length of the block.

It should also be noted that although the memory system in accordance with the invention has been described in terms of a particular hardware implementation, other implementations will be apparent to those skilled in the art. One such additional implementation, for example, may be in the location of the user CPU which, although shown as including binding registers 22, can be completely separate from binding registers. An example of such separate configuration is shown in copending U.S. patent application entitled "COMPUTER MEMORY SYSTEM " by Oxley et al Ser. No. 630,476, filed July, 1984, which application is assigned to the assignee hereof and incorporated herein by reference.

Although the invention has been described and illustrated with a certain degree of particularity, it is understood that the present disclosure has been made by way of example only and that numerous changes in the combination and arrangement of parts may be resorted to by those skilled in the art without departing from the spirit and scope of the invention as hereinafter claimed.

What is claimed is:

1. A computer system, comprising:
   a memory having a logical address space which can be mapped onto a virtual address space, which can in turn be mapped onto a physical address space;
   and a virtual machine interconnected to the memory and serving to (1) interpret a set of instructions defining the virtual machine, and (2) translate logical addresses to virtual addresses for application to said memory, and including means for generating said set of virtual machine defining instructions, including allocating blocks of logical address space, writing data into and reading from the allocated logical address space, for performing an "EQ" test for determining if two pointers within the logical address space refer to the same block of allocated logical address space, and copying contents of a first logical address to a second logical address within the allocated logical address space.

2. The computer system of claim 1 wherein said virtual machine comprises a CPU and a set of binding registers for interfacing said CPU to said virtual address space.

3. The computer system of claim 2 wherein a logical address comprises at least a binding register designator to identify an associated block within the logical address space.

4. The computer system of claim 3 wherein said logical address further comprises a relative index to a location within the block pointed to by the designated register.

5. The computer system of claim 4 wherein said physical address space comprises a semiconductor memory, a disk memory, and a disk controller, whereby said virtual machine controls the operation of said disk controller to control the flow of information between said disk memory and said semiconductor memory.

* * * * *